Aug. 31, 1926.

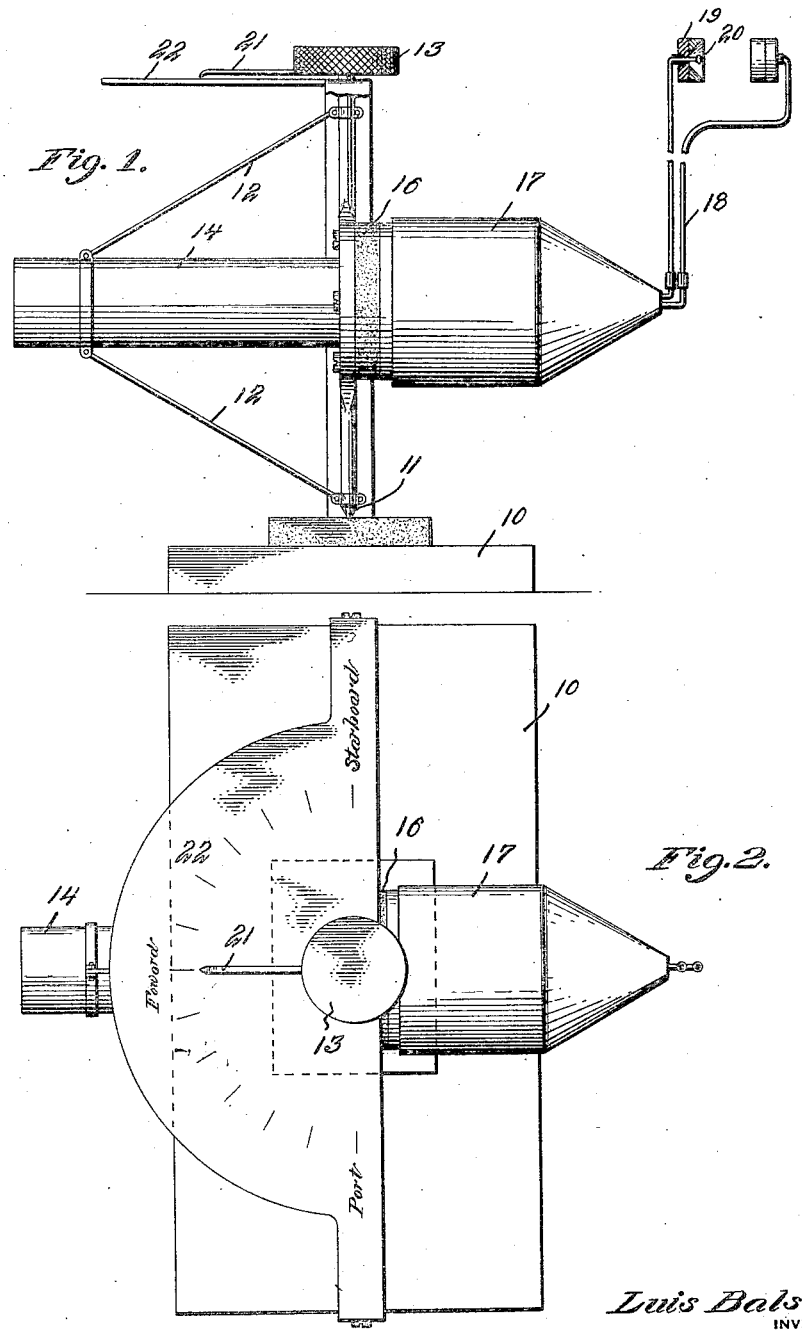

L. BALSERA 1,598,337

SOUND LOCATING DEVICE

Filed Dec. 3, 1921   2 Sheets-Sheet 2

Luis Balsera
INVENTOR

BY Victor J. Evans
ATTORNEY

UNITED STATES PATENT OFFICE.

LUIS BALSERA, OF BROOKLYN, NEW YORK, ASSIGNOR OF ONE-HALF TO LAUREANO SANJURJO, OF BROOKLYN, NEW YORK.

SOUND-LOCATING DEVICE.

Application filed December 3, 1921. Serial No. 519,759.

This invention relates to apparatus for locating sound and has for an object the provision of a device which is adapted for use upon vessels, for determining the direction of sound whether the sound producing source is approaching or moving away, the invention being especially useful during fogs.

Another object of the invention is the provision of an apparatus which is simple in construction and operation and which may be easily and quickly manipulated to obtain the desired result.

With the above and other objects in view, the invention further includes the following novel features and details of construction, to be hereinafter more fully described, illustrated in the accompanying drawings and pointed out in the appended claim.

In the drawings:—

Figure 1 is an elevation of a sound locating apparatus constructed in accordance with the invention.

Figure 2 is a plan view of the same.

Figure 3:
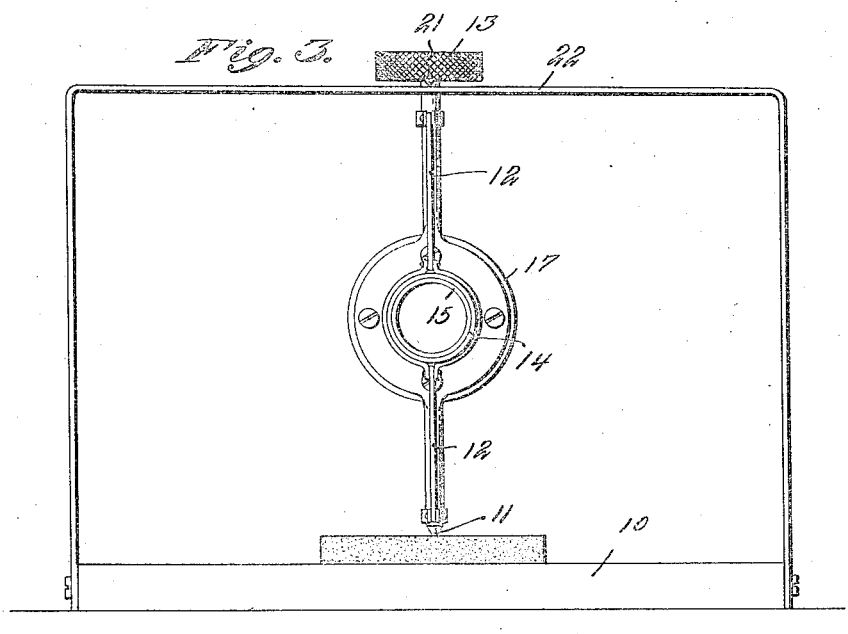
Figure 3 is an end view.
Figure 4:
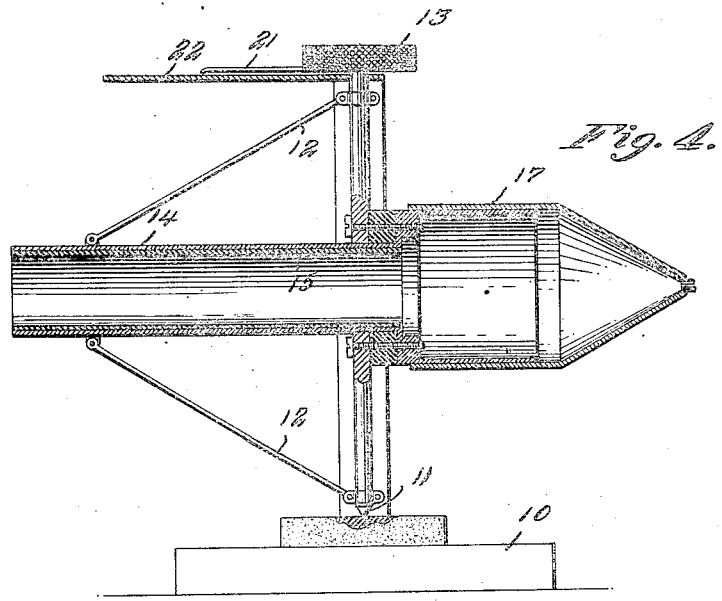
Figure 4 is a section through the apparatus.

Referring in detail to the drawings, wherein like characters of reference denote corresponding parts, the invention is shown as including a base 10 which is formed preferably of insulating material, so that sound will not enter the instrument through the base. Mounted upon this base upon a pivot 11 is a frame 12 which is capable of being horizontally moved upon the pivot and for this purpose is provided with a knob or grip 13.

Secured within the frame is a horizontally arranged tube 14 which is open at both ends and is designed for the passage of sound. This tube is provided with a sound proof insulating lining 15 to prevent sound waves from reaching the inner wall of the tube. The purpose of this is to retard the passage of the sound waves through the tube when the said waves strike the inner wall at an angle to the direction of travel of the sound, so as to permit of the greatest volume of sound passing through the tube only when the said tube is pointed exactly in the direction of the source of said sound.

Secured to the inner end of the tube as shown at 16 is a Koeintz resonator 17, which is telescopically adjustable so that it may be regulated in proportion to the length of the sound waves passing through the tube, as will be readily understood. Extending from this resonator 17 are tubes 18 which have receivers 19 connected thereto. These receivers are preferably provided with extensions 20 which may enter the opening of the ear so as to more readily direct the sound.

Extending from the knob 13 is an indicator or pointer 21, which travels over a graduated scale 22 which may contain suitable indicia, such as "Forward", "Port" and "Starboard".

The apparatus being carried upon a ship, as soon as the sound of a ship in the vicinity is detected, the direction of the origin of the sound may be determined by pointing the open end of the tube 14 in this direction. The device is then manipulated by moving the tube upon the pivot 11 until the volume of sound passing through the receivers 19 is at its greatest intensity. The tube 14 will be pointed directly at the source of origin of the sound. Its direction will then be indicated upon the scale 22. By keeping the tube thus pointed, it may be quickly determined whether or not the vessel is moving toward or away from the instrument by the increasing or diminishing character of the sound waves. The resonator 17 provides for an accurate adjustment of the device to the length of the sound waves.

The invention is susceptible of various changs in its form, proportions and minor details of construction and the right is herein reserved to make such changes as properly fall within the scope of the appended claim.

Having described the invention what is claimed is:—

A sound locating apparatus comprising a base, a vertically disposed frame secured to the base, a horizontally extending bar spaced above the base and included in the frame, a vertically disposed pivot rod extending downwardly through the horizontal bar and having its lower end rotatably engaging the base, a horizontally disposed sound receiving tube secured to the pivot rod, a resonator at one end of the tube, a receiver associated with the resonator, a horizontally disposed dial extending from one edge of the horizontal bar and a pointer movable with the pivot rod over the dial.

In testimony whereof I affix my signature.

LUIS BALSERA.